US010004036B2

(12) United States Patent
Caracas et al.

(10) Patent No.: US 10,004,036 B2
(45) Date of Patent: Jun. 19, 2018

(54) MANAGING POWER CONSUMPTION IN TREE-BASED TDMA MULTI-HOP WIRELESS NETWORKS

(71) Applicant: International Business Machines Corporation, Armonk, NY (US)

(72) Inventors: Alexandru Caracas, Thalwil (CH); Marcus B. Oestreicher, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 14/883,770

(22) Filed: Oct. 15, 2015

(65) Prior Publication Data

US 2016/0112950 A1   Apr. 21, 2016

(30) Foreign Application Priority Data

Oct. 17, 2014 (GB) .................................. 1418405.5

(51) Int. Cl.
*H04W 52/02* (2009.01)
*H04W 84/20* (2009.01)

(52) U.S. Cl.
CPC ... *H04W 52/0219* (2013.01); *H04W 52/0222* (2013.01); *H04W 84/20* (2013.01); *Y02B 60/50* (2013.01)

(58) Field of Classification Search
CPC ......... H04W 52/0219; H04W 52/0222; H04W 52/02; H04W 52/0261; H04W 52/0251; H04L 43/0852
See application file for complete search history.

(56) References Cited

U.S. PATENT DOCUMENTS

| 5,138,615 A | * | 8/1992 | Lamport ................. H04L 45/02 370/400 |
| 7,729,285 B2 | | 6/2010 | Yoon |
| 8,514,758 B2 | | 8/2013 | DeKimpe et al. |
| 2009/0147714 A1 | | 6/2009 | Aggarwal et al. |

(Continued)

FOREIGN PATENT DOCUMENTS

| CN | 101188535 B | 5/2008 |
| CN | 101577664 A | 11/2009 |

(Continued)

OTHER PUBLICATIONS

Hongju Cheng, "Energy-Efficient Algorithm for Broadcasting in Ad Hoc Wireless Sensor Networks", Sensors, Apr. 12, 2013, 4922-4946, 13(4), MDPI, Basel, Switzerland.

(Continued)

*Primary Examiner* — Omer S Mian
(74) *Attorney, Agent, or Firm* — Rabin Bhattacharya

(57) ABSTRACT

Method for managing power consumption in tree-based, Time-Division Multiple Access (TDMA), multi-hop wireless networks. The method includes at each node set the steps of: relinquishing its initial role in the network if a condition related to the power consumption of the node is not met; and adopting a new role in the network according to a TDMA protocol of said network; wherein the node stops emitting beacons to a child node thereof and/or stops acknowledging beacons from a parent node, and wherein each node has a lower power consumption in this new role than it had in its initial role.

5 Claims, 6 Drawing Sheets

(56) References Cited

U.S. PATENT DOCUMENTS

| | | | |
|---|---|---|---|
| 2010/0157827 A1* | 6/2010 | Park | H04L 43/0852 370/252 |
| 2012/0117213 A1* | 5/2012 | Shaffer | H04L 47/726 709/223 |
| 2013/0039240 A1 | 2/2013 | Chen et al. | |

FOREIGN PATENT DOCUMENTS

| | | |
|---|---|---|
| CN | 102026331 A | 4/2011 |
| EP | 2779751 A2 | 9/2014 |
| GB | 2468065 A | 8/2010 |

OTHER PUBLICATIONS

Yusheng Ji, "Flow-balanced Routing for Multi-hop Clustered Wireless Sensor Networks", Ad Hoc Networks, Jan. 2013, 541-555, 11(1), Elsevier Science Publishers, B. V. Amsterdam, The Netherlands.

* cited by examiner

MANAGING POWER CONSUMPTION IN TREE-BASED TDMA MULTI-HOP WIRELESS NETWORKS

CROSS-REFERENCE TO RELATED APPLICATION

This application claims the benefit of priority from United Kingdom Patent Application No. 1418405.5, filed Oct. 17, 2014, the contents of which are incorporated herein by reference.

FIELD OF THE INVENTION

The invention relates in general to the field of methods for managing tree-based Time-Division Multiple Access (TDMA) multi-hop wireless networks, as well as related networks and network devices like nodes, sensor nodes, motes, and systems. In particular, it is directed to methods for reducing or balancing power consumption in such networks.

BACKGROUND

A wireless sensor network typically is a network of spatially distributed sensors, which are used to monitor physical or environmental conditions, such as temperature or pressure. Sensors cooperate to transmit data they collect through the network, typically to a main, collector location. Sensor networks can be bi-directional. They are typically used in industrial or consumer applications.

Multi-hop wireless network protocols are especially popular in sensor networks which are required to cover large areas. To minimize costs and maintenance efforts, the sensor nodes shall typically have limited resources and operate for extended periods of time on the initial set of batteries. In this case, battery consumption is a limiting factor. A known solution for reducing energy consumption is to rely on Time-Division Multiple Access (TDMA) protocols.

A wireless sensor network using TDMA is usually modelled as a tree of nodes (the latter representing the sensors). Typically, each individual node knows only its direct child nodes and parent nodes. The full tree is only available to and managed by the root node. To minimize protocol complexity and resource utilization, inner nodes lack the full information about the tree. To avoid collisions and to save energy, nodes communicate only with their (first neighbor) parent and child nodes, at designated times. Namely, designated time slots are agreed, during which the nodes switch on their radio chips to either receive or send a message. Outside of such time slots, the nodes sleep or minimize their activities as much as possible, in order to save power.

Each node is assigned an additional time slot, during which it listens to messages from any node, especially for association requests sent by nodes attempting to join the network. The association request is forwarded to the root node which schedules the distribution of time slots. If accepted, an association response with timing and slots information is sent down the tree to the parent node of the joining node. The parent forwards the response on the shared slot to the child node, the latter then becoming part of the tree and aware of all of its assigned time slots.

As the system lacks global time and local clocks drift among the nodes, the clock between parent and child nodes is synchronized using beacon messages. Beacon messages can contain state information such as a list of known child nodes, and are also sent during a time slot assigned by the central root node. When a node sends data to the root node up the tree, it sends a packet to his parent in the assigned slot. The parent buffers the packet and sends it later further up during the time slot allocated to him and his parent. Similarly, packets can travel from the root node to inner nodes in the tree.

When a node does not receive a parent beacon for some time, it assumes the parent node to be lost and therefore tries to re-associate with the network. Similarly, a parent node might assume a child node to be lost when the parent does not receive any message for some time. The parent node will then notify the loss to the root, to update the latter as to the network state.

SUMMARY OF THE INVENTION

The present invention provides a method for managing power consumption in a tree-based, TDMA multi-hop wireless network, including a set of nodes powered by a battery, the method including, at each node set the steps of: relinquishing its initial role in the network if a condition related to the power consumption of the node is not met; and adopting a new role in the network according to a TDMA protocol of said network; wherein the node stops emitting beacons to a child node thereof and/or stops acknowledging beacons from a parent node, and wherein each node has a lower power consumption in this new role than it had in its initial role.

DETAILED DESCRIPTION OF THE PREFERRED EMBODIMENTS

Figure 1:
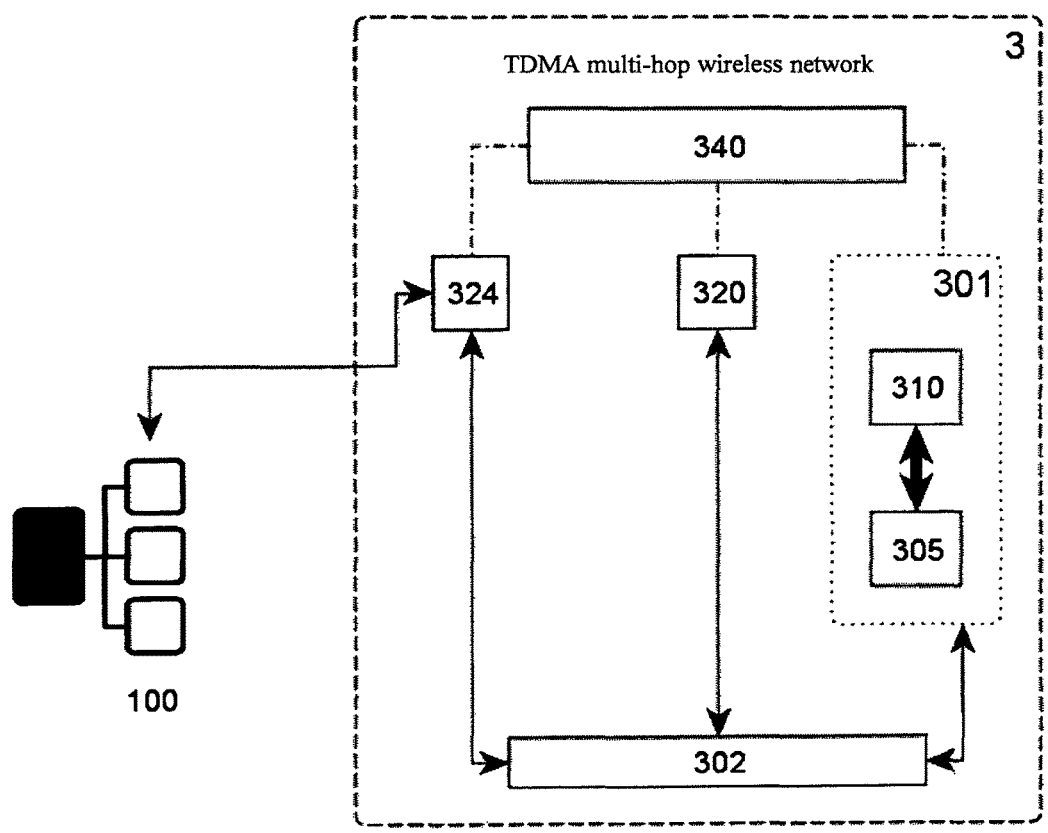
FIG. 1 schematically represents a node of a tree-based TDMA multi-hop wireless network, suited for implementing method steps as in embodiments of the invention.

Referring generally to FIGS. 1 through 6, an aspect of the invention is first described, which concerns a method for managing power consumption in a tree-based TDMA multi-hop wireless network 100. Basically, the network includes a set of nodes, denoted in FIGS. 2 through 4 by the following references: ROOT, 2 . . . 15. The nodes are powered by a battery 340. Typically, each node is equipped with a respective battery as nodes are typically spatially distributed sensors. Still, embodiments can be contemplated where a same battery powers several nodes, e.g., a subset of nodes of the nodes.

The present method revolves around the following two basic steps. First, and for each node: if a condition related to the power consumption of the node (e.g., a battery level above a given threshold) is not met, then this node (e.g., node 3 in FIGS. 2 through 4) relinquishes S40 its initial role in the network. As a result, this node 3 stops emitting S42 beacons to child nodes thereof (e.g., nodes 7, 10 in FIGS. 2 through 4) and/or acknowledging S44 beacons from a parent node thereof (e.g., node 2 in FIGS. 2 through 4). Second, a node 3 shall adopt S50 a new role in the network, according to a TDMA protocol of the network. In this new role, the node shall have a lower power consumption than it had in its initial role. These two steps are concurrently implemented at each node of the set. However, that the steps shall not be implemented at the same time. Rather, the actual timing for a node to relinquish its role depends on the above condition, i.e., related to the power consumption of this node, which condition does likely occur at different times for each node.

Note that, in the tree-based TDMA network, a node will usually try to re-attach to the network as a leaf node, if possible. As such, it will consume less power than a parent node, as it only has to acknowledge beacons from its parent. In embodiments (see e.g., FIGS. 4 and 6), a given node, for which the above condition is not fulfilled, can negotiate to swap its role with a child node thereof (instead of only trying to re-attach as a leaf node). The child node can itself have child nodes, but it shall have less child nodes than the given node. In either case, the above scheme makes it possible to balance power consumption in the network, since the new role is meant to be less demanding in terms of power consumption.

Note that the power consumption can be calculated or pre-determined, based on a simple parameter set. The calculated or pre-determined value is typically meant to reflect an average power consumption. Normally, the topology that a node would have in its new role would suffice to conclude as to whether the power consumption is lowered or not. For instance, as a leaf node the node shall necessarily have a lower power consumption than as a parent node, since no beacon messages need be passed at a lower level in the tree.

Figure 2:
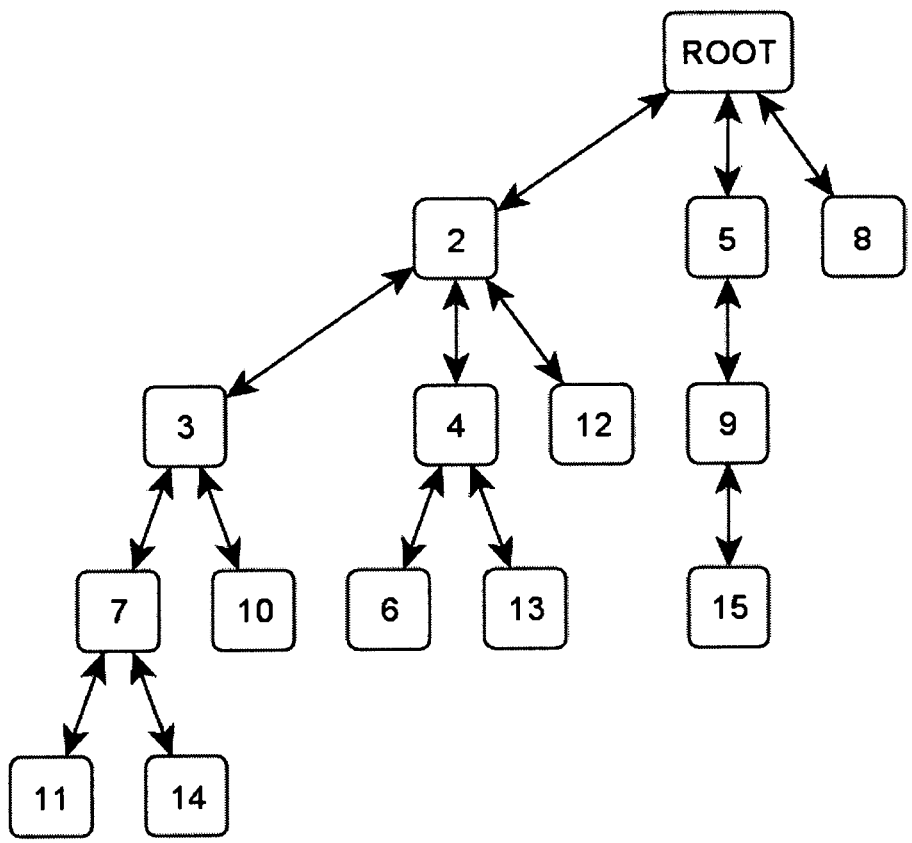
FIG. 2 is a diagram schematically illustrating a tree-based TDMA multi-hop wireless network in an initial state, in a simplified representation, as involved in embodiments.
Figure 3:
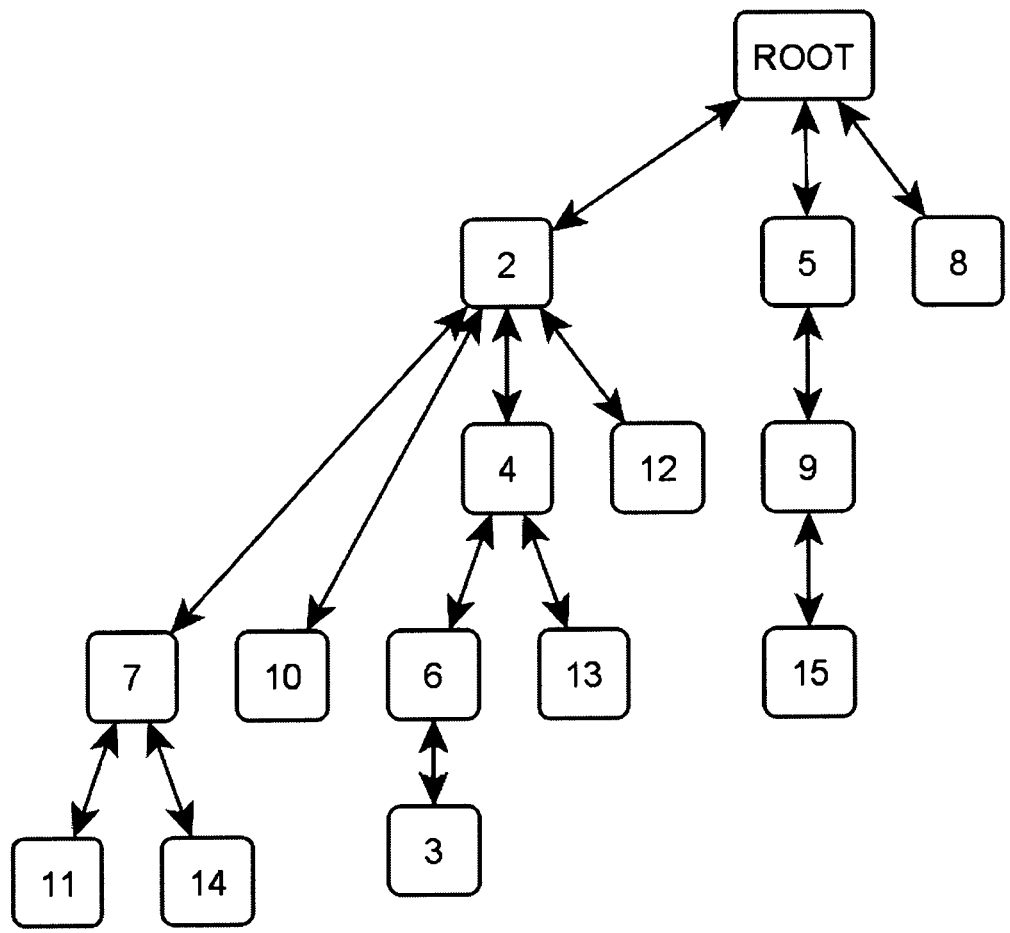
FIG. 3 is a block diagram schematically illustrating a subsequent state of the network of FIG. 2, after a node has adopted a new role in the network and has re-attached as a leaf node, as involved in embodiments.
Figure 4:
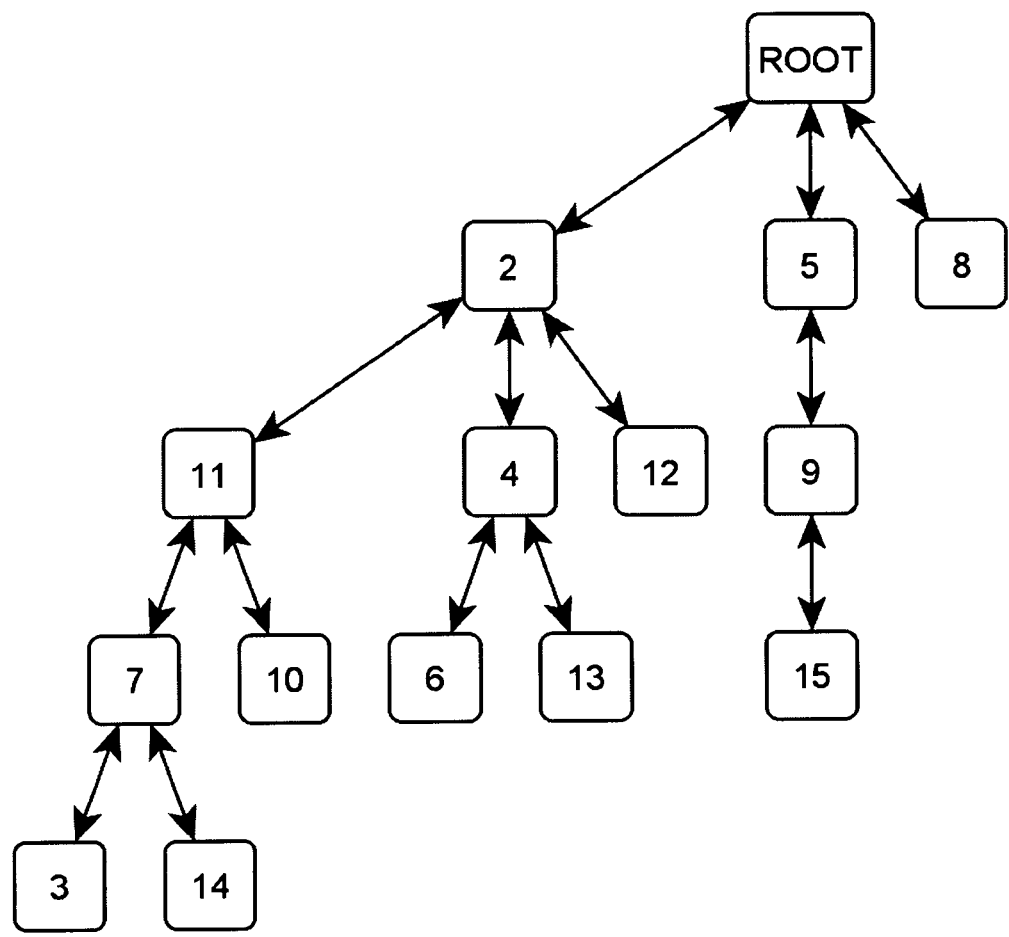
FIG. 4 illustrates another state of the network of FIG. 2, after two nodes have swapped their roles in the network, as involved in embodiments.

The above method is preferably sought to be systematically implemented, that is, independently from the status of the links of the network, i.e., irrespective of whether there is a broken link detected or not. Rather, the present method actually results in forcefully breaking one or more links and allow the tree to recover (i.e., to re-form) on its own, and this, according to a TDMA protocol, as illustrated in FIGS. 2 through 4.

The method can further include one or more of the following features: at each node of the set: upon relinquishing its initial role and prior to adopting the new role, going into a lower power consumption mode, such as a sleep or hibernation mode, than the each node had in its initial role, during a period of time; the period of time is an upper bound for a time needed for children of the each node to re-attach to the network according to a TDMA protocol, wherein, preferably, the upper bound is computed at a node prior to relinquishing its initial role; the period of time depends on the tree depth and the number of children of the each node.

The method can further include, at each of the set of nodes, updating its own tree depth and number of children prior to relinquishing its initial role; adopting the new role includes, for the each node: re-attaching to the network, preferably upon expiration of a period of time that is an upper bound for a time needed for children of the each node to re-attach to the network according to a TDMA protocol; re-attaching to the network to re-attach includes negotiating according to a TDMA protocol to re-attach as a leaf node; negotiating includes accepting to handle, as a parent node, one or more of the child nodes that the each node already had before relinquishing its initial role.

The method can further include, before the each node relinquishes its initial role: reading a current power level of the battery, and wherein the each node relinquishes its initial role if the read power level is below a given threshold; each node of the set is powered by a respective battery, the network being preferably an heterogeneous network, and wherein reading the current power level includes reading a current power level of a respective battery of the each node, and wherein, preferably, the given threshold is a threshold specific to that node.

The method can further include receiving, at the each node, the given threshold, the latter having been propagated to the each node via the network, prior to reading the current power level; and a node relinquishes its initial role to adopt, as a new role, the role of another one of the nodes of the set, which preferably is a child node of the node, whereby the another one of the nodes henceforth handles one or more child nodes that the node had in its initial role.

The invention can be embodied as a tree-based TDMA multi-hop wireless network of nodes equipped with computerized methods designed such as for the nodes of the set to concurrently implement all the steps of the method according to any one of the above embodiments.

The invention can be embodied as a tree-based TDMA multi-hop wireless network node, equipped with computerized methods designed to implement all the steps of the method according to any one of the above embodiments.

The invention can be embodied as a computer program product for managing power consumption in a tree-based TDMA multi-hop wireless network of nodes, including a computer-readable storage medium having computer-readable program code.

Devices, networks and methods embodying the present invention will now be described, by way of non-limiting examples, and in reference to the accompanying drawings.

Still, the present approach is otherwise not tightly coupled with a specific network protocol. This approach is not dependent on the protocol used and a priori can be applied to any TDMA routing tree protocol. Also, the present approach is not concerned with how to establish the tree, but rather how to modify it to balance power consumption. To that aim, the present methods result in forcefully breaking one or more link the each node had in its initial role, and then allow the tree to recover on its own.

Importantly, there is no need here to communicate additional local information to the neighboring nodes, for a node to relinquish its role, which would create extra messages and thus overhead. In other words, the present approach does not require extra messages, as enough information is available locally on the node itself for the present purpose. Of course, communications can be necessary for a node to re-attach to the network but this possibility is already provided under TDMA protocols.

Thus, the decision (as to whether to relinquish a role) can be taken entirely locally by a node. As a result, the present invention can also be embodied as a node of a tree-based TDMA multi-hop wireless network of nodes. The node needs to be equipped with adequate computerized methods to implement the steps of the present methods. A fortiori, the invention can also be implemented as a TDMA multi-hop wireless network of such nodes. The computerized methods at stakes can also be embodied as computer program products.

Finally, it is noted that the present approach applies to homogeneous network as well as to heterogeneous nodes. The above condition can be estimated locally, relatively and specifically to each node. Each node can for instance be equipped with its own battery.

Figure 5:
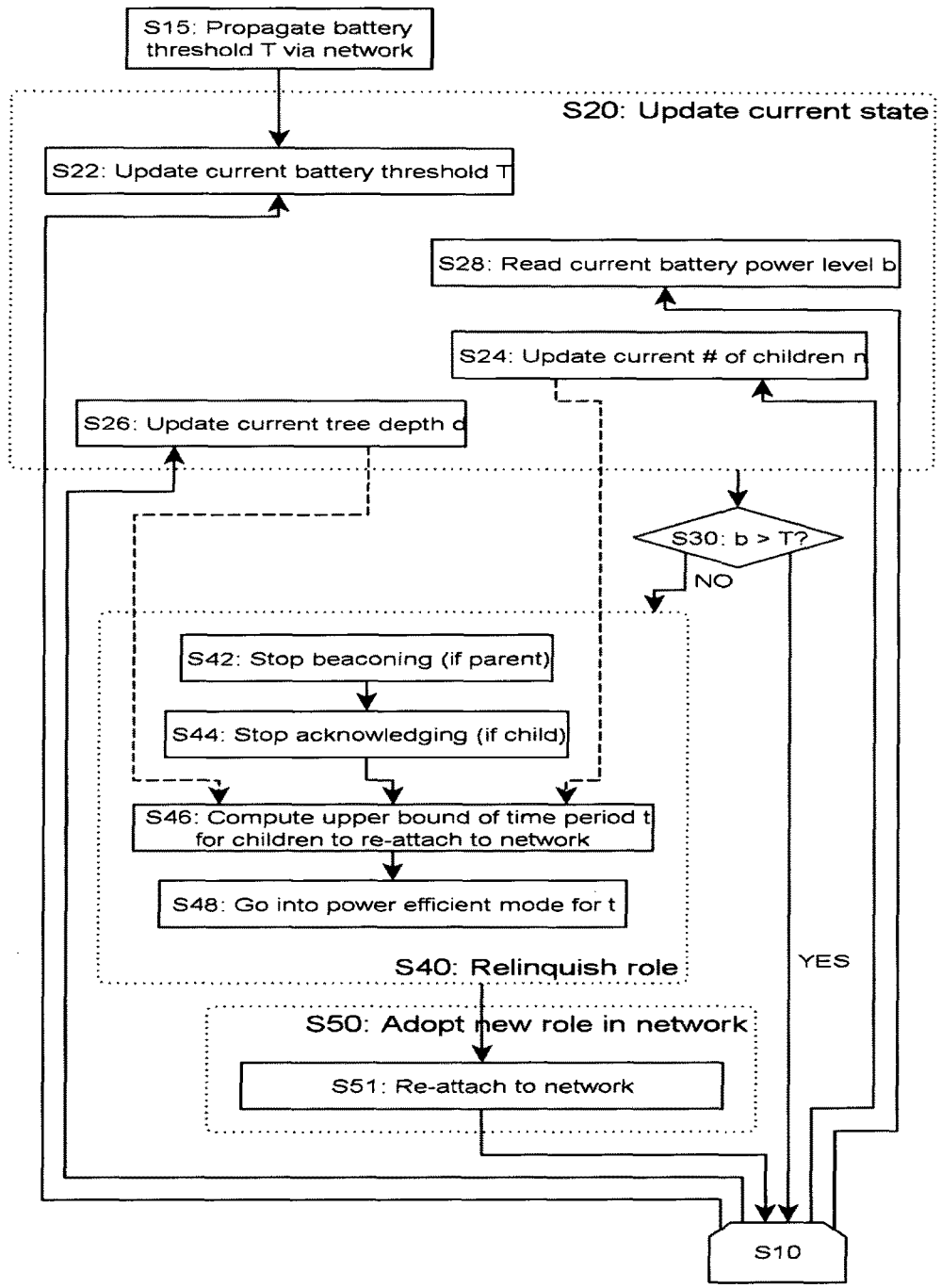
FIG. 5 is a flowchart illustrating high-level steps of a method for managing a tree-based TDMA multi-hop wireless network, where nodes forcibly adopt new roles, in order to balance power consumption in the network, as in embodiments.
Figure 6:
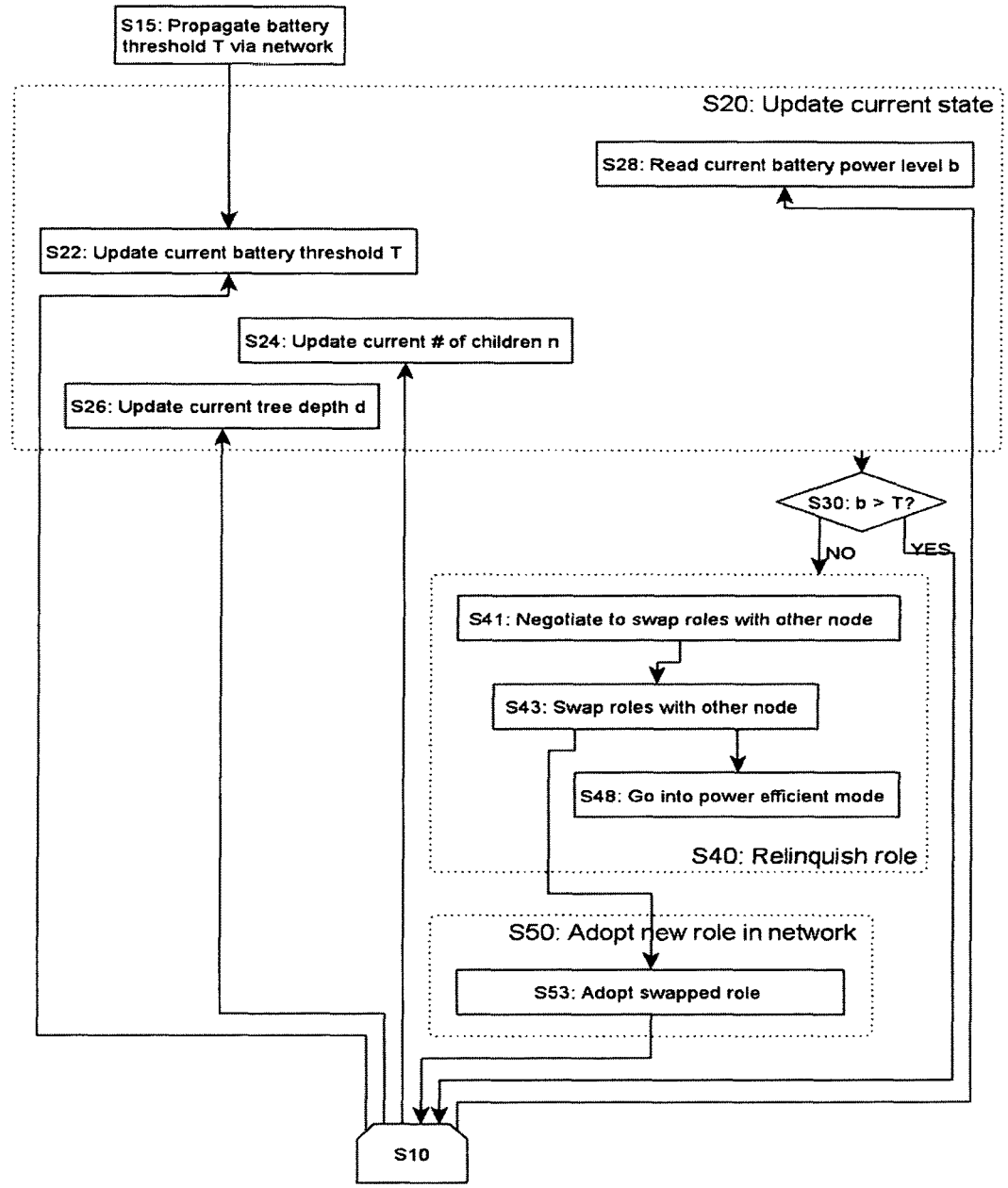
FIG. 6 is a flowchart illustrating high-level steps of another method for managing a tree-based TDMA multi-hop wireless network, where nodes forcibly swap their roles, again to balance power consumption in the network, as involved in embodiments.

Referring now more specifically to FIGS. 5 and 6: in embodiments, the above method can further include the following step: upon relinquishing S40 its initial role and prior to adopting S50 a new role, a node 3 can go S48 into a lower power consumption mode, such as a sleep or hibernation mode, than it had in its initial role, and this during a given period of time t. By construction, the latter is bounded by the time at which the node relinquishes its role and the time at which it adopts its new role. This further helps in reducing the power consumption.

Preferably, the period of time t is an upper bound for a time needed for children of the node under consideration (call it the "current" node), to re-attach to the network according to a TDMA protocol. Advantageously, the upper bound is computed S46 at the current node prior to relinquishing its initial role. Thus, once more, the decision can be made locally, without requiring external information and without additional communication required. The period of time t can for instance be simply but accurately estimated based on the tree depth d and the number n of children of the current node.

Preferably, a current node 3 shall update S24, S26 its own tree depth d and number n of children, prior to relinquishing its initial role, and more preferably prior to evaluate the condition, to more accurately estimate the period of time t.

Referring now more specifically to FIG. 5, in embodiments, a node shall simply try, when adopting S50 a new role, to re-attach S51 to the network, and without imposing any further change in the roles of other nodes. For example, minimal changes to the tree are sought. Preferably, a node shall re-attach upon expiration of the period of time t (e.g., the upper bound for the time needed for children to re-attach to the network), to optimize the timing.

This is illustrated in FIGS. 2 and 3. Here, node 3 that initially (FIG. 2) is a child of node 2 and a parent of nodes 7 and 10 considers to re-attach S51 to the network. To that aim, it merely negotiates (according to a TDMA protocol) to re-attach as a leaf node. Once granted, the node 3 can adopt a new role as illustrated in FIG. 3, where it is now a child of node 6. In the meantime, nodes 7 and 10 have re-attached as a child of node 2. Their local configuration is unchanged, apart from the fact they now report to node 2 instead of node 3.

However, more complex situations can occur, depending on the availability of the nodes (it being noted their limited communication ranges), where a node negotiating to re-attach to the network should accept to handle, in its new role, one or more of child nodes, possibly child nodes it already had before relinquishing its initial role.

At present, and referring to FIGS. 5 and 6, more shall be about the above condition, i.e., the condition related to the power consumption of the node. This condition can simply be based on comparing an actual battery level to a threshold. Before a node relinquishes S40 its initial role, it can read S28 a current power level b of the battery that powers it. A node shall then relinquish its initial role if the read power level is below a given threshold T. This is advantageous as it makes it possible for the nodes to dynamically and flexibly relinquish its (or swap their) role(s) in the network, taking into account the actual, recent status of their power consumptions. In other variants, the condition can be estimated based on other parameters, e.g., a measured local activity, which allows the power consumption to be to indirectly estimated. This condition can also (partly) be computed externally. For example, an externally estimated time period threshold can be passed to the nodes, via the network. More sophisticated parameters can also be passed to the nodes, which can subsequently estimate their power consumption, rather than reading a current power level of their battery. However, such solutions are less preferred inasmuch as they require additional communications via the network. Preferably, the decision is made locally, based on parameters locally read, computed and/or estimated. Since those parameters shall typically be specific to each node, one understands that decisions to change of role will be made at different times for the nodes, due to their different, past power consumption.

Referring now altogether to FIGS. 1, 5 and 6: in embodiments, and as evoked earlier, each node is powered by a respective battery 340. Thus, a node can read S28 a current power level b of a respective battery. If the nodes are heterogeneous, the threshold T that it shall consider can typically be specific to that node. Thus, the present invention can optimally be applied to heterogeneous networks as well.

A node can observe a constant threshold value T, stored ab initio in a memory of the node, such that no additional communication is required for the node to evaluate the above condition. In variants, the threshold value T can be dynamically optimized, possibly specifically for each node, which can be of advantage as the network condition evolves. In that respect, as illustrated in FIGS. 5, 6, a node 3 can receive, step S22, a given, possibly specific threshold T, which has been propagated S15 to the node 3 via the network, prior to reading the current power level b (and thus prior to evaluate the above condition). In still other variants, the threshold value can be locally updated by the nodes, thanks to any suitable algorithm.

In embodiments, nodes can try to swap their roles, instead of merely trying to re-attach as a leaf node without otherwise imposing complex changes to other nodes. Note, however, that these two classes of embodiments are not incompatible. Sophisticated scenarios can consist for a node to try to re-attach as a leaf node (as per a TDMA protocol in place). If it is not possible, a node can then try to swap its role with another node. In even more sophisticated scenarios, a node can choose among two alternatives: (i) re-attach as a parent node (here again according to a TDMA protocol) or by swapping its role with another node. Furthermore, and depending on the negotiation, two nodes can only partially swap their roles, such that one or each of the candidate nodes can henceforth handle S43 one or more of the child nodes they initially had. Of course, each node of interest can be equipped with wireless communication means 324 and the negotiations limited to nodes that are within wireless communication range.

A simple swap scenario is now discussed in reference to FIGS. 4 and 6. Here, a current node 3 relinquishes S43 its initial role (as in FIG. 2) to adopt S53, as a new role (FIG. 4), the role of a lower level node 11 (which typically has consumed less power), and provided that this node 11 is within wireless communication range of the current node. Furthermore, node 11 can accept to adopt the initial role of node 3 only if it has, a priori, adequate power. As a result, the node 11 can henceforth handle S43 all the child nodes 7, 10 that node 3 initially had.

In case of partial swapping, node 11 can end up handling only part of the child nodes (say node 7 only) that node 3 initially had (not illustrated). The rest of the children can be appointed to one or more other nodes or will try to re-attach to the network using the TDMA protocol in place. Swapping shall preferably be contemplated between nodes that are linked by a direct, single link, which facilitates the negotiation.

The above embodiments have been succinctly described in reference to the accompanying drawings and can accommodate a number of variants. Several combinations of the above features can be contemplated. Examples are given in the next section. In particular, embodiments recited in respect of the present methods can consistently reflect in embodiments directed to a network or a node.

Preferably, sensor nodes are considered. Sensor nodes (or motes), are configured to gather sensory information, perform some (limited) processing and communicate with other connected nodes in the network 100. The root node ROOT is typically configured to perform more complex tasks. It can be regarded as a "supernode", having more computational and memory capabilities. In all cases, the nodes and the root can be regarded as a computerized unit, such as depicted in FIG. 1. As known, the main components of a sensor node is typically a microcontroller, including: a processor core, memory with programs stored on the memory and executable by the processor core, and programmable input/output peripherals such as timers, event counters, etc. The microcontroller processes data (performs simple tasks) and controls other components in the node, which are generally: a transceiver (or more generally a network interface) to interact with the network, an external memory or storage, a power source; and one or more sensors interfaced through input controller.

For instance, and as illustrated in FIG. 1, a preferred node 3 is one that includes a microcontroller 301, also called MCU. The latter can be decomposed as a processing component 305 (including processor or logic, etc.) and a memory 310 component, interacting with the later, as known. Additional external memory (not shown) can be involved, if needed. The node 3 can further include any suitable wireless, network-enabling component 324, preferably a radio chip. If the node is a sensor node, it includes a sensing element 320. More generally, the node can produce data, by any means (not necessarily through a sensor 320), which data is transmitted to the rest of the network 100. The components are suitable connected via a bus 302 or any suitable communication infrastructure. Some of the components, e.g., components 301, 320, 324, need be powered. To that aim, the node 3 can include its own battery (or, in variants, be connected to a common battery). Power can be delivered directly through a dedicated infrastructure, or, in variants, using the communication infrastructure 302.

Nodes, networks of such nodes, and more generally computerized devices can be suitably designed for implementing embodiments of the present invention as described herein. In that respect, it can be appreciated that the methods described herein are largely non-interactive and automated. In exemplary embodiments, the methods described herein can be implemented either in an interactive, partly-interactive or non-interactive system. The methods described herein can be implemented in software (e.g., microcode), hardware, or a combination thereof. In exemplary embodiments, the methods described herein are implemented in software, as an executable program, the latter executed by suitable digital processing devices 301.

For instance, the node 3 depicted in FIG. 1 schematically represents a sensor node. In exemplary embodiments, in terms of hardware architecture, as shown in FIG. 1, the unit 301 includes a processor 305, memory 310, if necessary coupled to a memory controller (not shown). The node can include additional elements, which are omitted for simplicity, such as controllers, buffers (caches), drivers, repeaters, and receivers, to enable communications. Further, the local interface can include address, control, and/or data connections to enable appropriate communications among the aforementioned components.

The processing element 305 is a hardware device for executing code, particularly that stored in memory 310. The processor can be any custom made or commercially available processor, a semiconductor based microprocessor (in the form of a microchip or chip set), or generally any device for executing software instructions.

The memory 310 can include any one or combination of volatile memory elements and nonvolatile memory elements. Moreover, the memory can incorporate electronic, magnetic, optical, and/or other types of storage media. Note that the memory can, as a whole, have a distributed architecture, where various components are situated remote from one another, but can be accessed by the processor 305.

The software or code in memory 310 can include one or more separate programs, each of which includes a listing of executable instructions for implementing logical functions. In the example of FIG. 1, the software in the memory 310 includes methods described herein in accordance with exemplary embodiments. It can further provide scheduling, input-output control, data management, memory management, and communication control and related services.

The node can include other I/O devices 320, which can include sensors, i.e., hardware devices that produce a measurable response to a change in a physical condition like temperature or pressure (physical data to be monitored). Typically, the analog signal produced by the sensors is digitized by an analog-to-digital converter and sent to a controller for further processing. Sensor nodes are ideally small, consume low energy, are autonomous and operate unattended.

In addition, other I/O devices can be present to communicate data inputs and outputs. The node 3 can further include a network interface or transceiver for coupling to the rest of the network 100. The network 100 transmits and receives data between the unit 3 and other nodes, particularly the root node ROOT, in a wireless fashion, e.g., using wireless protocols and technologies, such as WiFi, WiMax, etc.

When the unit 3 is in operation, the processor 305 is configured to execute software stored within the memory 310, to communicate data to and from the memory 310, and to generally control operations of the node 3 pursuant to the software. The methods described herein, in whole or in part are read by the processor, typically buffered within the processor, and then executed. When the methods described herein are implemented in software, the methods can be stored on any computer readable medium, for use by or in connection with any suitable computer related system or method.

As will be appreciated by one skilled in the art, aspects of the present invention can be embodied as a network, method or computer program product. Accordingly, aspects of the present invention can take the form of an entirely hardware embodiment, an entirely software embodiment (including micro-code, etc.) or an embodiment combining software and hardware aspects. Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embodied on a computer readable medium can be transmitted using any appropriate medium, including but not limited to wireless, wireline, optical fiber cable, RF, etc., or any suitable combination of the foregoing.

Should embodiments involve collecting user's data or otherwise sensitive data, at least some embodiments can be contemplated wherein sensitive data need not be permanently stored, or are stored such as to meet any legal provision and/or ethic requirement as applicable.

Aspects of the present invention are described above with reference to flowchart illustrations and/or block diagrams of methods, apparatus (systems) and computer program products according to embodiments of the invention. It will be understood that each block of the flowchart illustrations and/or block diagrams can be implemented by computer program instructions. These computer program instructions can be provided to a processor or other programmable data processing apparatus to produce a machine, such that the instructions, which execute via the processor or other programmable data processing apparatus, create means for implementing the functions/acts specified in the flowchart and/or block diagram block or blocks.

The computer program instructions can also be loaded onto any suitable programmable data processing apparatus, or other devices to cause a series of operational steps to be performed on the node 3, other programmable apparatus or other devices ROOT, 2, . . . 15 to produce a computer implemented process such that the instructions which execute on such programmable apparatus provide processes for implementing the functions/acts specified in the flowchart and/or block diagram block or blocks.

The flowchart and block diagrams in the figures illustrate the architecture, functionality, and operation of possible implementations of devices, systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved and algorithm optimization. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present invention has been described with reference to a limited number of embodiments, variants and the accompanying drawings, it will be understood by those skilled in the art that various changes can be made and equivalents can be substituted without departing from the scope of the present invention. In particular, a feature (device-like or method-like) recited in a given embodiment, variant or shown in a drawing can be combined with or replace another feature in another embodiment, variant or drawing, to obtain a new combination of features (not explicitly recited herein) that nevertheless remains within the scope of the present invention, especially where such a new combination would provide an advantage recited in the present description and, this, notwithstanding the particular technical contexts in which the features constituting this new combination can have been described, e.g., for the mere sake of illustration, and provided that such a new combination makes sense for the one skilled in the art, in view of other elements described in the present application, such as advantages provided by the features described herein. Various combinations of the features described in respect of any of the above embodiments or variants can accordingly be contemplated, that remain within the scope of the appended claims. In addition, many minor modifications can be made to adapt a particular situation to the teachings of the present invention without departing from its scope. Therefore, it is intended that the present invention not be limited to the particular embodiments disclosed, but that the present invention will include all embodiments falling within the scope of the appended claims. In addition, many variants not explicitly touched above can be contemplated. For example, the nodes can include additional memory, or several types of sensors, etc.

What is claimed is:

1. A method for managing power consumption at each node set in a tree-based, Time-Division Multiple Access (TDMA) multi-hop wireless network, which includes a set of nodes powered by a battery, the method comprising:

relinquishing an initial role of the node in the network if a condition related to the power consumption of the node is not met; and adopting a new role in the network according to a TDMA protocol of said network;

wherein, in the new role, the node stops emitting beacons to a child node and/or stops acknowledging beacons from a parent node; and wherein said each node has a lower power consumption in the new role than it has in its initial role;

relinquishing its initial role and prior to adopting said new role, at each node of the set, going into a lower power consumption mode than in its initial role during a period of time;

wherein said period of time is an upper bound for a time needed for children of each node to re-attach to the network according to a TDMA protocol, wherein said upper bound is computed at a node prior to relinquishing its initial role;

wherein said period of time depends on the tree depth and the number of children of each node;

updating its own tree depth and number of children prior to relinquishing its initial role at each of set of nodes;

wherein adopting said new role comprises re-attaching to the network upon expiration of a period of time that is an upper bound for a time needed for children of each node to re-attach to the network according to a TDMA protocol for each node;

wherein said re-attaching to the network comprises negotiating according to a TDMA protocol to re-attach as a leaf node;

wherein said negotiating comprises accepting to handle, as a parent node, one or more of the child nodes that each node already had before relinquishing its initial role;

reading a current power level of the battery wherein each node relinquishes its initial role if the read power level is below a given threshold, wherein reading said current power level includes reading a current power level of a respective battery of each node, and wherein said given threshold is a threshold specific to that node; and receiving at each node, said given threshold that has been propagated to each node via the network prior to reading said current power level.

2. The method of claim 1, wherein a node relinquishes its initial role to adopt the role of another one of the nodes so that said another one of the nodes henceforth handles at least one child node that said node had in its initial role.

3. The method of claim 1, wherein the nodes of set concurrently implement a tree-based TDMA multi-hop wireless network of nodes equipped with designed computerized methods.

4. The method of claim 2, wherein the nodes of set concurrently implement a tree-based TDMA multi-hop wireless network of nodes equipped with designed computerized methods.

5. The method of claim 1, wherein a tree-based TDMA multi-hop wireless network node equipped with designed computerized methods.

* * * * *